W. H. ALLEN.
METHOD OF DESICCATING ORGANIC MATTER.
APPLICATION FILED NOV. 4, 1912.
1,118,884.
Patented Nov. 24, 1914.
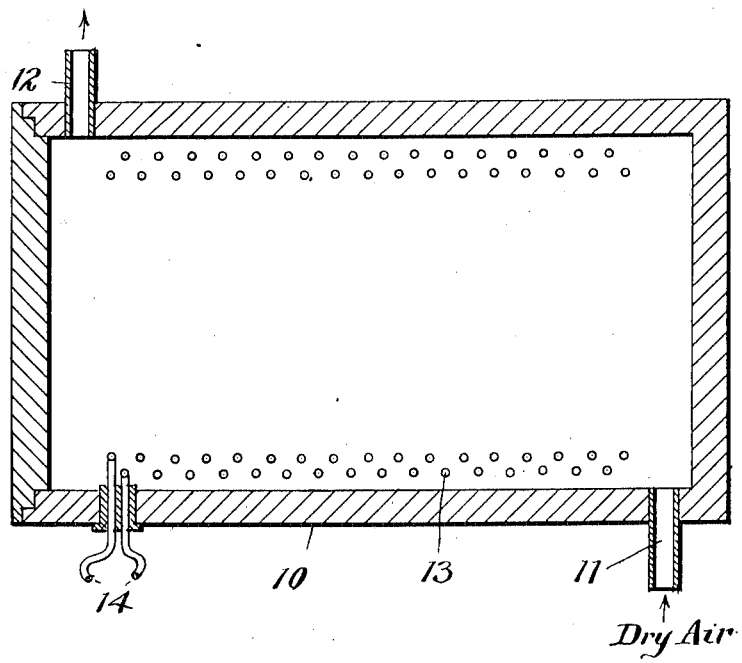

UNITED STATES PATENT OFFICE.

WILLIAM H. ALLEN, OF CLEVELAND, OHIO.

METHOD OF DESICCATING ORGANIC MATTER.

1,118,884.

Specification of Letters Patent. Patented Nov. 24, 1914.

Application filed November 4, 1912. Serial No. 729,278.

*To all whom it may concern:*

Be it known that I, WILLIAM H. ALLEN, a citizen of the United States, residing at Cleveland, in the county of Cuyahoga and State of Ohio, have invented a certain new and useful Improvement in Methods of Desiccating Organic Matter, of which the following is a full, clear, and exact description.

This invention relates to improvements in methods of desiccating organic matter, either animal or vegetable organic matter, and has particular utility in the desiccation of human bodies in mausoleum crypts, although it is not confined to this particular use.

It has been proposed heretofore to desiccate organic matter, and particularly human bodies by maintaining over and around the body a circulation of dry air, from which moisture has been extracted by chemicals.

I have found that the method mentioned above, that is the dry air method, is made more efficient and that the desiccation can be produced in a shorter period of time if the air is heated to a predetermined temperature above that at which decay germs may be formed. I have found that a temperature of 110° F. is ample for this purpose, although I prefer to maintain the temperature of the air in the compartment at about 115° F.

In one aspect, my present invention may be regarded as an improvement on the dry air desiccating methods, and in this respect my invention may be defined as consisting in subjecting the substance to the action of dry warm air which is preferably heated to a predetermined point or above that at which decay germs may develop. There has also been proposed and successfully carried out the desiccation of organic substances by subjecting the same to the action of a magnetic field, or by a magnetic field assisted by a circulation of dry air. This method forms the subject matter of my prior Patent No. 1,040,486, granted on the 8th day of October, 1912.

In my prior patent above referred to, the method as defined in one of its more specific aspects, consists in maintaining a circulation of cool dry air about the substance being desiccated, while the substance is subjected to the action of the magnetic field. This part of the method is successful and is, in fact, quite important if the temperature would otherwise be below that at which the decay germs may form. I have found, however, that it is not necessary to maintain the circulation of cool air around the substance while subjected to the action of the magnetic field, but that the rate of desiccation is enhanced if no attempt is made to cool the air, but rather if the air is heated to the point above described. I find also that my method of desiccating with a magnetic field and dry air circulation can be carried on much more inexpensively when the air is heated instead of cooled. This is true for the reason that I can dispense with any system of refrigeration, and can rely upon the heat due to the current in the magnet coil to heat the air around the substance being desiccated, and thus am enabled to employ smaller coil conductors.

Therefore, in its more specific aspect, my present invention may be defined as consisting in subjecting the substance to be desiccated to the action of magnetic field in a heated atmosphere, or in subjecting the substance to the action of a magnetic field and maintaining about the substance a circulation of air which is perfectly dry, and heating the air, the air being heated in any suitable manner, but preferably in the compartment by the current which traverses the coil. If the resistance of the magnet coil is not sufficient or otherwise suitable for this purpose, I may utilize a separate rheostat or heating resistance which may be located in the compartment, although not necessarily so.

My invention may further briefly be summarized as consisting in certain novel steps in the method of desiccating, as will be described in the specification and set forth in the appended claims.

The accompanying sheet of drawings shows in conventional and simplified form, an apparatus which may be utilized in carrying out my method.

Referring now to the drawings, 10 represents a compartment adapted to receive the substance to be desiccated. This compartment, which may be a mausoleum crypt, is closed, except for an inlet opening 11, preferably at the lower part of the compartment, and an outlet opening 12 preferably at the top of the compartment. Either within or without the compartment, but as here shown within the compartment, there is provided a coil 13, the primary purpose of which is to produce a desiccating magnetic field. The substance to be desiccated will be placed within this winding so that the magnetic field will pass through the substance. Preferably an alternating current is utilized which may be supplied to the coil through conductors 14. The circulation of air through the compartment may be a natural circulation, in which event, the coil 13 serves secondarily as a heating coil to maintain the temperature within the compartment above 110° F., or at about 115° F. I prefer, however, to maintain in the compartment by supplying to the inlet opening 11, a circulation of dry air from which moisture may be extracted in any suitable manner, but preferably by passing the same through or over a suitable chemical, which may be calcium chlorid. If the circulation of dry air is maintained, the air may be heated by the current passing through the coil, but I consider it within the scope of my invention to heat the air independently of the coil, either before or after passing the same into the compartment 10.

Having thus described my invention, what I claim is:

1. The method of desiccating an organic substance which consists in subjecting the substance to the action of a magnetic field which envelops the substance, in an atmosphere heated above the temperature at which decay germs may be formed.

2. The method of desiccating organic matter which consists in subjecting the same to the action of a magnetic field that envelops the substance, in an atmosphere heated to a point above 110 degrees Fahrenheit.

3. The method of desiccating organic matter which consists in subjecting the same to the action of a magnetic field that envelops the matter, and in heating the atmosphere about the matter by the magnetizing current, to a temperature above that at which decay germs may be formed.

4. A method of desiccating which consists in subjecting the substance to be treated to the action of a magnetic field, which envelops the substance, and in maintaining a circulation of dry air around the substance, and in heating the air to a temperature above that at which decay germs may be formed by the magnetizing current.

In testimony whereof, I hereunto affix my signature in the presence of two witnesses.

WILLIAM H. ALLEN.

Witnesses:
A. J. HUDSON,
A. F. KWIS.